United States Patent [19]

Huang

[11] Patent Number: 5,790,310
[45] Date of Patent: Aug. 4, 1998

[54] LENSLET MODULE FOR COUPLING TWO-DIMENSIONAL LASER ARRAY SYSTEMS

[75] Inventor: Sun-Yuan Huang, Blandon, Pa.

[73] Assignee: Lucent Technologies Inc., Murray Hill, N.J.

[21] Appl. No.: 736,697

[22] Filed: Oct. 28, 1996

[51] Int. Cl.$^6$ ........................... G02B 27/10
[52] U.S. Cl. ............... 359/618; 359/619; 359/626
[58] Field of Search ............... 359/619, 620, 359/625, 626, 618

[56] References Cited

U.S. PATENT DOCUMENTS

| | | | |
|---|---|---|---|
| 5,243,619 | 9/1993 | Albers et al. | 372/97 |
| 5,319,496 | 6/1994 | Jewell et al. | 359/741 |
| 5,333,077 | 7/1994 | Legar et al. | 359/619 |
| 5,517,359 | 5/1996 | Gelbart | 359/623 |
| 5,521,748 | 5/1996 | Sarraf | 359/321 |
| 5,568,318 | 10/1996 | Leger et al. | 359/618 |
| 5,594,752 | 1/1997 | Endriz | 372/50 |
| 5,617,492 | 4/1997 | Beach et al. | 385/33 |

FOREIGN PATENT DOCUMENTS 63-6517   1/1988   Japan ................ 359/618

*Primary Examiner*—Georgia Y. Epps
*Assistant Examiner*—Ricky Mack

[57] ABSTRACT

A lenslet module configured to receive light from a two dimensional laser array having laser sources disposed in a plurality of rows and columns, comprises a transparent substrate that has a light-receiving surface and a light-emitting surface. A plurality of light-receiving lenslets are disposed on the light-receiving surface of the substrate, such that each lenslet corresponds to a laser source in the laser array. An emitting lens is disposed on the light-emitting side of the substrate, in order to focus light collected by the receiving lenslets at a given focal length located at a distance away from the emitting lens. The light receiving lenses and the light-emitting lens are preferably configured as plano-convex lenses.

7 Claims, 3 Drawing Sheets

300

LENSLET MODULE FOR COUPLING TWO-DIMENSIONAL LASER ARRAY SYSTEMS

FIELD OF THE INVENTION

This invention relates to optical devices and more specifically to a lens array system employed to convert light generated by a semiconductor laser array.

BACKGROUND OF THE INVENTION

Semiconductor lasers have become desirable for use in high power laser applications. Because a single semiconductor laser may not generate sufficient power, currently high power semiconductor laser sources, generating high optical power, in the order of one watt or more, are made of semiconductor laser arrays. Such high power laser arrays have been employed in applications such as optical storage, printing and communications. Recent advances in development and use of cladding pump fiber lasers and amplifiers have further stimulated the need for high power two-dimensional semiconductor laser arrays.

One example of a semiconductor laser array, illustrated in FIG. 4, generates a combined light by a plurality of laser diodes. The operation and arrangement of the semiconductor laser array is explained in a copending patent application Ser. No. 08/736,698 filed concurrently with the present application, and is incorporated herein by reference. Semiconductor laser array 38 includes a plurality of laser bars stacked together on a base plate 40. Each laser bar includes a row of semiconductor laser diodes. A plurality of heat spreader plates is disposed in between the laser bars. Two sidewalls 42 and 44 are disposed on the base plate and provide a thermal path for heat generated by the laser diodes and transferred via the heat spreader plates. To this end, it is possible to fabricate an N×M semiconductor laser array, where N is the number of laser diodes contained in each laser bar, and, M is the number of laser bars stacked together.

It is desirable to focus the light generated by the individual laser diodes in a semiconductor laser array into a small area, such as the receiving end of a fiber optic employed to carry the generated light. To this end, it is necessary to employ a lens to accomplish the desired focusing of laser lights. FIG. 2, illustrates a prior art single lens system 360 that is employed to focus the light received from a semiconductor laser array 362 containing a plurality of laser diodes 364. The focused light is directed to a fiber optic 366 having a diameter of approximately 100 μm. The distance between individual laser diodes 364 is approximately 300 μm. Thus, the effective diameter $\Phi_A$ of a 3×3 laser array 362 is $$\phi_A = \sqrt{600^2 + 600^2} = 849 \, \mu m \tag{1}$$

It is thus possible to determine the required diameter of lens 360 such that substantially little light received from laser array 362 is truncated. In order to make this determination, it is first necessary to derive the required distance $l_o$ between the laser array and lens 360, and the required distance $l_i$ between the lens and fiber optic 366. To this end, the required magnification, m, of lens 360 is $$m = \frac{\phi_f}{\phi_A} = \frac{100}{849} \approx 0.12 \tag{2}$$

where $\Phi_A$ is the effective diameter of semiconductor laser array 362 and $\Phi_f$ is the diameter of fiber optic 366. It is noted that the required magnification of the lens system, among other things, depends on the distance between individual laser diodes disposed in semiconductor laser array 362. The relationship between distance $l_o$ and $l_i$ is governed by $$\frac{l_o}{l_i} = m = 0.12 \tag{3}$$

$$\frac{1}{l_o} + \frac{1}{l_i} = \frac{1}{f} \rightarrow l_i = 1.1f \quad l_o = 9.5f \tag{4}$$

where f is the focal length of lens 360. A commercially available lens with a substantially large numerical aperture has a focal length of approximately 1.45 mm and an effective diameter, D, of approximately 1.60 mm. The required diameter, D, of lens 360 is $$D = \phi_A + 2 * l_o \tan\frac{\theta_l}{2} = 0.849 \, mm + \tag{5}$$

$$2 * 13.775 \, mm * \tan\frac{30°}{2} = 8.23 \, mm$$

where $\theta_1$ is the divergence angle of laser diode light along a vertical plane, as illustrated in FIG. 5. For a lens having a diameter of 8.23 mm in the arrangement illustrated in FIG. 9, the required numerical aperture, NA, of the lens would be $$NA = \frac{D}{2 * l_i} = \frac{8.23}{2} * \frac{1}{1.45} = 2.84 \tag{6}$$

Since the maximum NA for any lens cannot exceed 1, it is evident that the arrangement illustrated in FIG. 2 is not suitable for converting light into a fiber optic.

FIG. 3 illustrates another prior art lens system 370, known as confocal lens system that is employed to convert light generated by semiconductor laser array 362 into fiber optic 366. Confocal lens system 370 includes a first plano-convex lens 372 configured to receive light from semiconductor laser array 362 and a second plano-convex lens 374 configured to direct light to fiber optic 366.

As illustrated in reference with FIG. 3, the effective diameter of semiconductor laser array 362 is approximately 849 μm. Lens 372 may be a commercially available lens with a diameter, $D_1$, of approximately 8 mm. Lens 374 may be a commercially available lens with a diameter $D_2$, of approximately 1.5 mm. It is desired that the focal length, $f_2$, of lens 374, be approximately 1.0 mm in order to achieve a sufficiently good focus. Furthermore, as explained above with reference to FIG. 2, the magnification, m, of confocal lens system 370 is governed by $f_2/f_1$, and is approximately 8.

It is noted that for the confocal lens system illustrated in FIG. 3, magnification m, among other things, depends on the distance of individual laser diodes disposed in semiconductor laser array 362. Thus, the focal length, $f_2$, of lens 372 is approximately 8 mm in view of the fact that $f_2/f_1$, in a confocal lens system is substantially equal to the magnification ratio. In view of the above characteristics of confocal lens system 370, the spot size $W_1$, of laser array 362 at a lens system is $$W_1 = 2 * f_1 \tan\frac{\theta_l}{2} = 2 * 8 \, mm * \tan\frac{30°}{2} = 4.29 \, mm \gg 1.5 \, mm \tag{7}$$

Therefore, if the light is to be collected by lens 374 without substantial truncation, the required numerical aperture NA of lens 374 is $$NA = \frac{D_2}{2f_2} = \frac{4.29 \text{ mm}}{2*1 \text{ mm}} = 2.15 \quad (8)$$

which is an impossible result again.

Thus, there is a need for a lens system that is compact and is also capable of converting light emitted by a semiconductor laser array system and focus this light on a desired location with substantially large optical coupling efficiency.

SUMMARY OF THE INVENTION

Briefly, in accordance with one aspect of the invention a lenslet module configured to receive light from a semiconductor laser array having laser sources disposed in a plurality of rows and columns, the lenslet module comprises a transparent substrate, adapted to transmit light; a plurality of light receiving lenslets disposed on the light receiving side of the substrate, such that each lenslet corresponds to a laser source in the laser array; and an emitting lens disposed on the light emitting side of the substrate, in order to focus light collected by the receiving lenslets at a given distance.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

Detailed Description of The Drawings As previously mentioned, a semiconductor laser array may be employed in many applications. As mentioned above, FIG. 4 illustrates one embodiment of a semiconductor laser array, such as 38, in accordance with the present invention, which may be used to generate a laser light having substantially high optical power. As will be explained in more detail below, the semiconductor laser array includes a plurality of individual laser diodes forming a two dimensional array.

Figure 1:
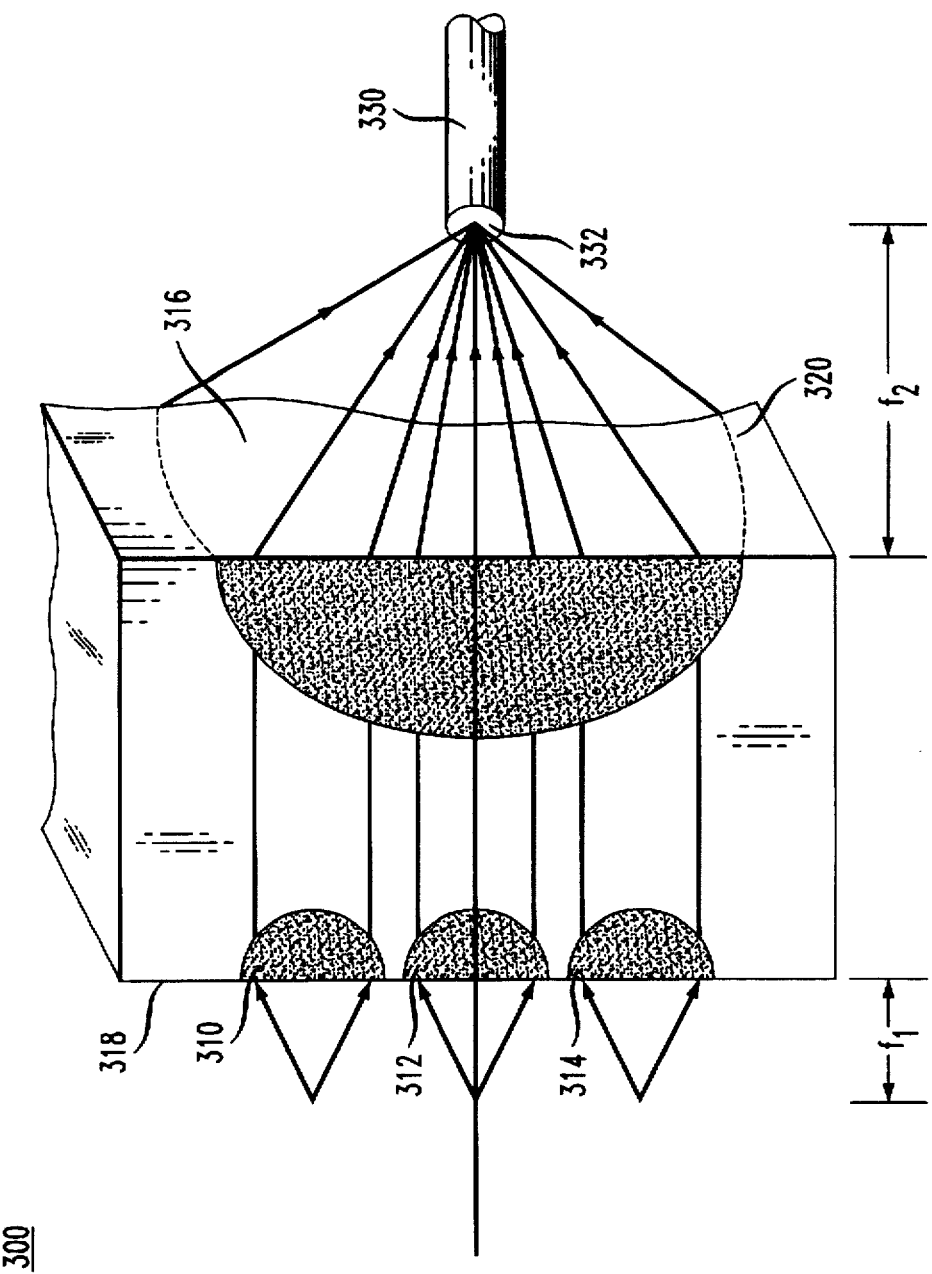
FIG. 1 is a lenslet module in accordance with one embodiment of the present invention, employed to collect light from a semiconductor laser array.
Figure 2:
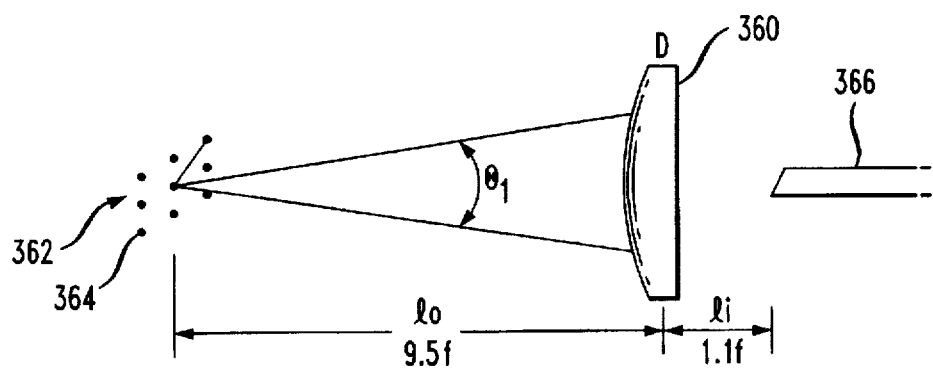
FIG. 2 is a prior art lens arrangement employed to collect light from a semiconductor laser array.
Figure 3:
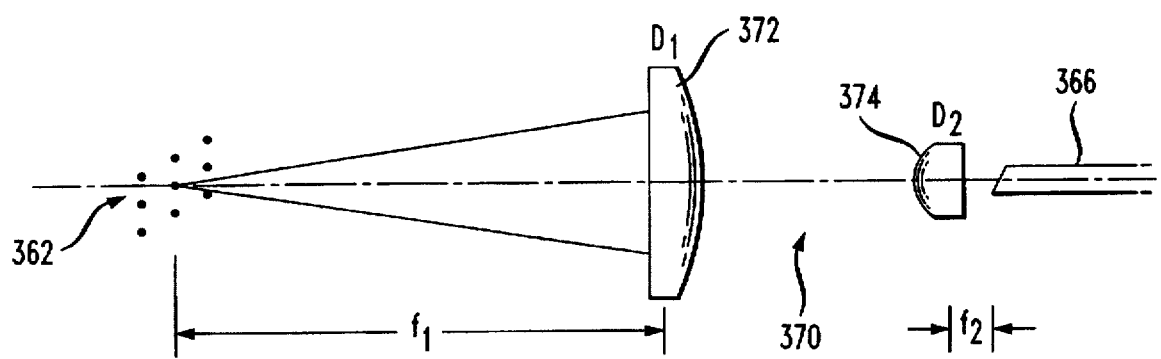
FIG. 3 is another prior art lens arrangement employed to collect light from a semiconductor laser array.

However, in order to be able to convert the lights emitted from each individual laser diode to a focal point efficiently, a monolithic lenslet module 300, as illustrated in FIG. 1 is employed in accordance with one embodiment of the invention, although the invention is not limited in scope in that respect.

Monolithic lenslet module 300 includes a plurality of receiving plano-convex lenses, such as 310, 312 and 314, and one relatively larger emitting plano-convex lens 316. Lenslet module 300 is configured to receive light emitted from individual laser diodes, such as those employed in a semiconductor laser array illustrated in FIG. 4. It is noted that the invention is not limited in scope in that respect, and lenslet module 300 may be employed to receive light from any two-dimensional laser array. To this end, lenslet module 300 includes a side wall 318 for receiving light, and a side wall 320 for emitting the light.

The plurality of receiving plano-convex lenses, such as 310, 312 and 314 are disposed within side wall 318, and the number of these lenses corresponds to the number of laser diodes employed in a semiconductor laser array, which provides a plurality of laser lights. For example, lenslet module 300 preferably includes 9 receiving lenses when it is employed to convert light generated by a 3×3 semiconductor laser array.

A monolithic lenslet module is preferably developed by employing one of many known techniques used to prepare micro-optic lenslets, as described in *Handbook of Optics*, Vol. II, Devices, Measurements, and Properties, pp. 7.12–7.16 (McGraw Hill, 2nd. Ed 1995). Briefly, there are at least three processes that have been employed to construct a monolithic lenslet module. These processes depend, among other things, on using a master made of high-purity annealed and polished material. After the master is formed, a small amount of release agent is applied to the surface. Thereafter, a small amount of epoxy is placed on the surface of the master. A thin glass substrate is placed over the epoxy. The epoxy and the glass are then subjected to a curing process, so that the epoxy material is formed within the glass substrate in accordance with the pattern on the surface of the master. The second process to develop a lenslet module employs injection molding. This process may be used for high-volume applications. The third process for fabricating a monolithic lenslet module is to grow infrared materials, like zinc selenide, on the master by chemical vapor deposition technique.

In addition to the above-described technique it is noted that in accordance with one embodiment of the present invention, a monolithic lenslet module, such as 300, may advantageously be fabricated by employing gradient index of refraction (GRIN) lens techniques. Briefly an index of refraction gradient is introduced in a portion of a glass substrate at a location where a lenslet is desired. This index of refraction gradient is advantageously introduced by employing an ion exchange technique. A glass substrate is first coated with a metallic film. The film is then patterned with a mask that allows ions to diffuse from a molten salt bath through open areas of the mask. Ions in the glass substrate are exchanged for other ions in the molten salt at high temperatures. The diffused ions change the refractive index of the substrate by an amount that is proportional to their electric polarizability and concentration.

Another technique, which may be employed to fabricate a monolithic lenslet module, such as 300 is the process used to develop micro-fresnel lenses. This process is well-known and described in *Handbook Of Optics*, Vol. II, Devices, Measurements, and Properties, pp. 7.18–7.27 (McGraw Hill, 2nd Ed. 1995). Generally, there are several technologies that may be used to fabricate micro-fresnel lenses, which may also be employed to fabricate the lenslet module in accordance with the present invention. These technologies include electron-beam writing in resist, laser writing in resist, diamond turning, and molding.

FIG. 1 also illustrates an optical fiber 330 employed to carry light that is emitted from monolithic lenslet module 300. As illustrated, the receiving side 332 of optical fiber 330 is positioned at the focal point of emitting lens 316. The diameter of optical fiber 330 is approximately 100 µm and its numerical aperture $NA_f$ is approximately 0.2. As will be explained in more detail hereinafter, lenslet module 300 advantageously directs a substantial portion of light generated by a semiconductor laser array arranged to provide light to the optical fiber.

Figure 4:
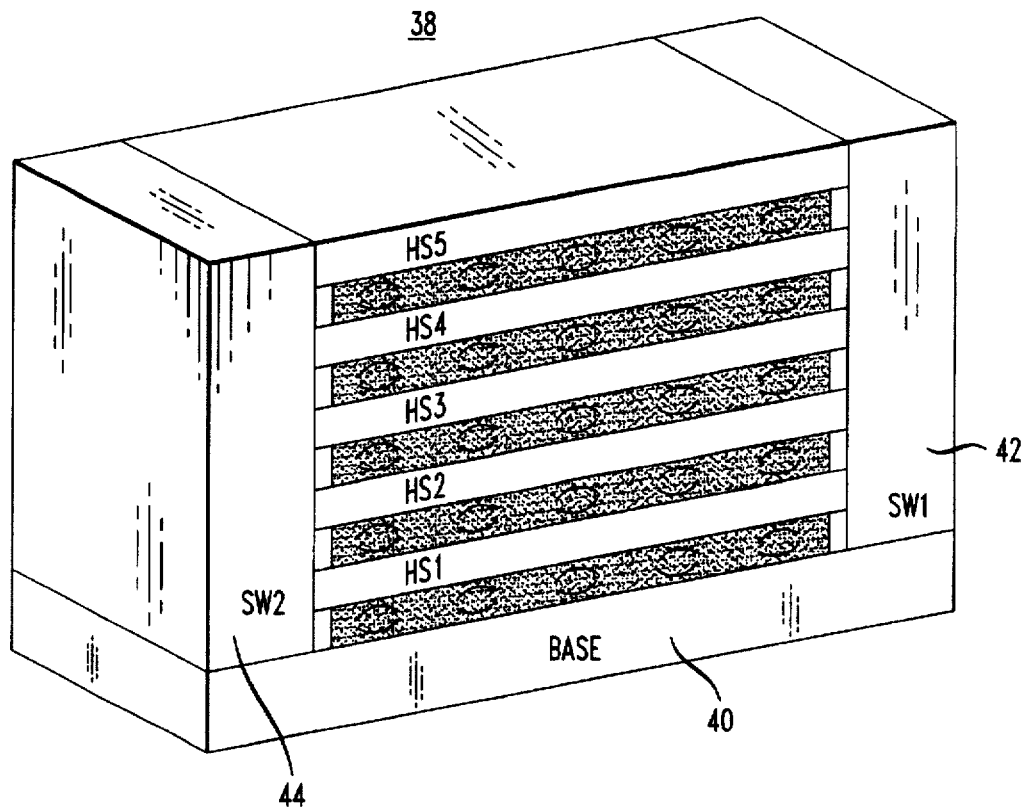
FIG. 4 illustrates a semiconductor laser array in accordance with one embodiment of the present invention.
Figure 5:
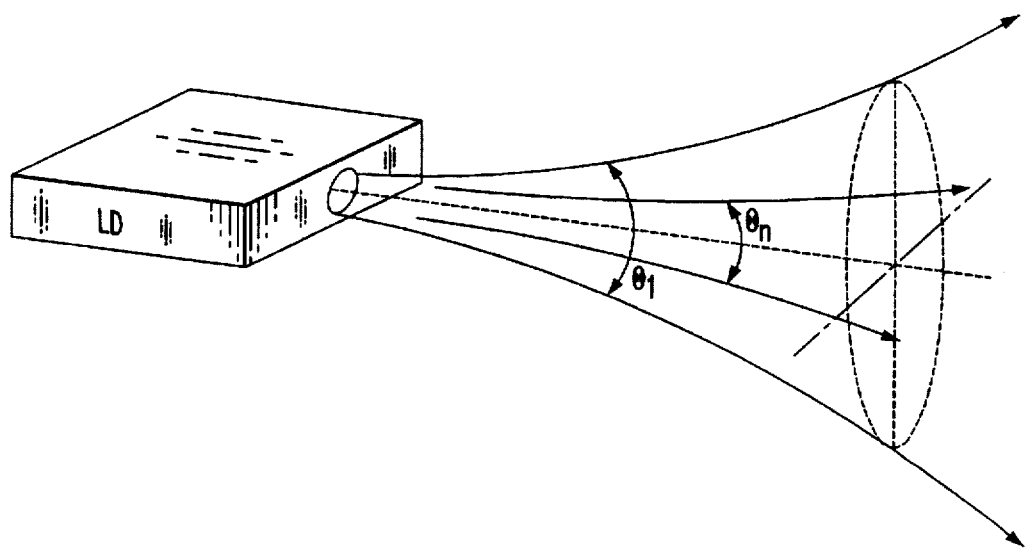
FIGS. 5 illustrates horizontal and vertical divergence of light emitted from a laser array in accordance with an embodiment of the present invention.

The lenslet module fabricated in accordance with the present invention is capable of focusing light at a fiber optic having a relatively small diameter. An example of the range of the diameter of a fiber optic that can be used with the lenslet module, such as 300, is explained hereinafter. For example, the total spot size at the facet of each emitting laser diode disposed in a laser array, such as 38, which is illustrated in FIG. 4, is derived based on the horizontal and vertical divergent angles $\theta_1$, and $\theta_1$, respectively, as illustrated in FIG. 5. This spot size is employed to measure the size of the image of light at the focal point of emitting lens 316. By knowing the image size for the arrangement illustrated in FIG. 1, the required diameter of fiber optic 330 for containing a substantial portion of the image can be determined. For example, each laser in a laser array employing 980 µm InGaAs/GaAs single mode laser diodes, has a horizontal spot size $\omega_1$ is approximately 2.1 µm at the facet of an emitting laser diode as derived by Gaussian beam propagation theory. Likewise the vertical spot size $\omega_1$ is approximately 0.7 µm.

In one embodiment of the present invention the diameter of each receiving lens in FIG. 1 is approximately 300 µm, and the distance $f_1$, between lenslet module 300 and a laser array configured to provide light to the lenslet module is approximately 300 µm. The numerical aperture $NA_1$, for each receiving lens is $$NA_1 = \frac{\Phi'}{2f_1} = 0.5 \qquad (9)$$

where $\Phi'$ is the diameter of each one of the receiving lenses.

The desired numerical aperture $NA_2$ for emitting lens 316 is 0.2. This follows because the numerical aperture $NA_f$ of fiber optic 330 is approximately 0.2 also. As a result, $$NA_2 = \frac{D_2}{2F_2} = 0.2 \qquad (10)$$

Where $D_2$ is the diameter of emitting lens 316, and $f_2$ is the focal length of emitting lens 316. The diameter $D_2$ is substantially equal to the sum of diameters of laser diodes along the height of lenslet module 300. For a 3×3 lenslet module, $$D_2 = N\, D_1 = 3 \times 300 = 900\ \mu m \qquad (11)$$

It is thus possible to calculate $f_2$ as follows:

$$f_2 = \frac{900}{0.4} = 2250\ \mu m \qquad (12)$$

The magnification of the lens arrangement of a lenslet module is $$m = \frac{f_2}{f_1} = 7.5 \qquad (13)$$

based on the foregoing information, it is possible to calculate the image constraints imposed by the lenslet module 300 in accordance with the present invention. Thus, $$\omega_{DL} = \frac{1.22\lambda}{NA_2} = \frac{1.22 \times 0.98\ \mu m}{0.2} = 6.0\ \mu m \qquad (14)$$

wherein $\omega_{DL}$ is the diffraction limit of the spot size at the focal distance f2. For the embodiment illustrated in FIG. 1, this 6.0 µm size represents the spot size at the receiving side 332 of fiber optic 330. In addition to the diffraction limit, it is possible to calculate the spherical aberration as $$\omega_{SA} = 0.536 \times f_2 \times (NA_2)^3 = 0.536 \times 2250 \times (0.2)^3 = 9.5\ \mu m \qquad (15)$$

Finally, the image size at edge 332 of fiber optic 330 is derived by $$\omega_{IM} = m \cdot \omega_1 = 7.5 \times 2.1\ \mu m = 15.6\ \mu m. \qquad (16)$$

Thus, in accordance with one embodiment of the present invention, such as 300, it is possible to efficiently convert laser light generated by a semiconductor laser array to a core of a multimode fiber having a diameter of approximately 15.6 µm or larger. It will be appreciated that such a diameter is substantially smaller than the diameter of fiber optics that was required to be used in accordance with prior art lens arrangements.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A lenslet module configured to receive light from a two dimensional laser array having laser sources disposed in a plurality of rows and columns, said lenslet module comprising:

a transparent substrate made of a material which transmits light, said transparent substrate having a light-receiving surface and a light-emitting surface;

a plurality of light-receiving lenslets disposed on said light-receiving surface of said substrate, such that each lenslet corresponds to a laser source in the laser array; and an emitting lens disposed on said light-emitting side of said substrate, in order to focus light collected by said receiving lenslets at a given focal length located at a distance away from said emitting lens, said light receiving lenslets and said emitting lens configured such that the magnification factor of said lenslet modules is such that the size of the image is at least equal to a diffraction limit of a spot size at said given focal length at a distance away from said emitting lens.

2. The lenslet module in accordance with claim 1, wherein said light receiving lenses are configured as plano-convex lenses.

3. The lenslet module in accordance with claim 1, wherein said light-emitting lens is configured as a plano-convex lens.

4. The lenslet module in accordance with claim 1, wherein said light receiving side and said light emitting side are opposite walls of said transparent substrate.

5. The lenslet module in accordance with claim 1, wherein said transparent substrate is made of a glass substrate.

6. The lenslet module in accordance with claim 1, wherein said light receiving lenses and said light emitting lens are made of infrared materials.

7. The lenslet module in accordance with claim 1, wherein said light receiving lenses and said light emitting lens are gradient index of refraction (GRIN) lenses.

* * * * *